F. GIRARD.
SUSPENSION FOR BARS ON LATHES FOR DRESSING, CUTTING, OR WORKING THE SAME.
APPLICATION FILED OCT. 20, 1909.
962,829.  Patented June 28, 1910.
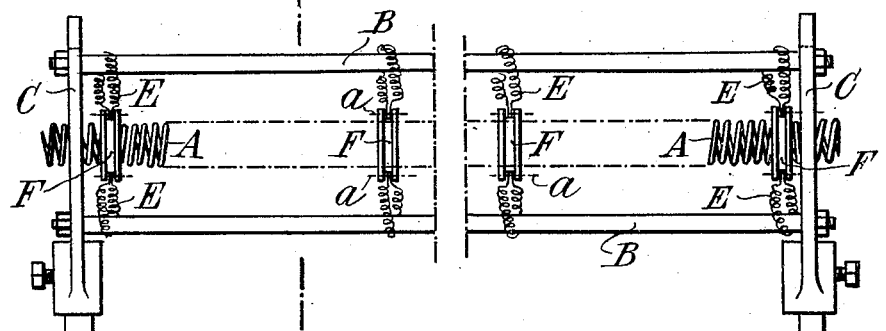
*Fig. 1.*
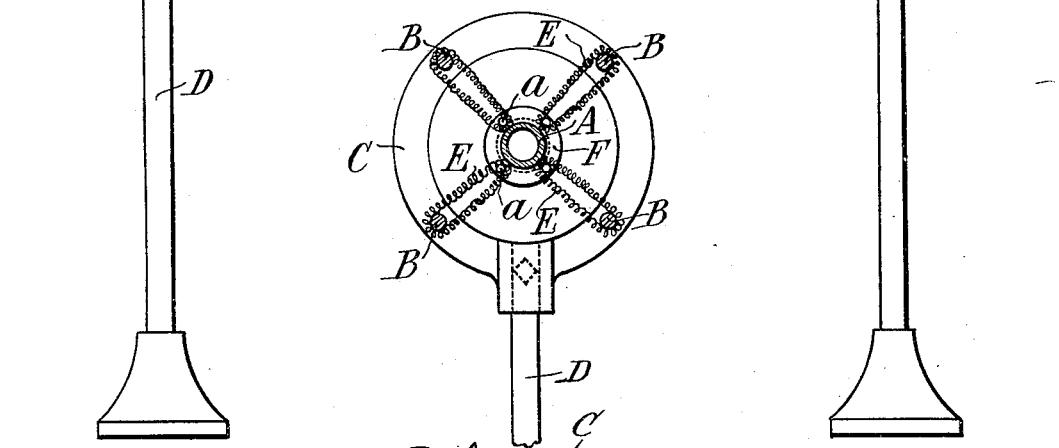
*Fig. 2.*
*Fig. 3.*
Witnesses:
René Buine
William F. Martinez
Inventor:
Ferdinand Girard
By Attorneys

UNITED STATES PATENT OFFICE.

FERDINAND GIRARD, OF PARIS, FRANCE.

SUSPENSION FOR BARS ON LATHES FOR DRESSING, CUTTING, OR WORKING THE SAME.

962,829. Specification of Letters Patent. Patented June 28, 1910.

Application filed October 20, 1909. Serial No. 523,725.

*To all whom it may concern:*

Be it known that I, FERDINAND GIRARD, a citizen of the Republic of France, residing in Paris, France, have invented certain new and useful Improvements in Suspension for Bars on Lathes for Dressing, Cutting, or Working the Same, of which the following is a specification.

This invention relates to an arrangement which allows of supporting the metal bar operated upon in lathes for dressing, cutting or working the same (*tours à decolleter*) in such a way as to obviate the great noise usually caused by the rotation of the said bar. As is known, these bars rotate in a metal or wooden guide tube; this tube is subjected during the work to a succession of repeated shocks due to the rotation of the bar and to the eccentricity produced thereon by centrifugal force. This drawback is avoided by the apparatus of the present invention, which is shown by way of example in the accompanying drawings in which:—

Figure 1 is a longitudinal elevation and Fig. 2 a cross section of the suspension device. Fig. 3 is an elevation of the same used in connection with a lathe.

The bar to be operated on is supported in a tube A formed by a coiled spring; a distinctive point of the invention is that this coiled spring tube is suspended centrally of a group of parallel longitudinal rods B, the number of which may vary but is at least three. Four are shown in the drawing. The suspension of the tube A centrally of the rods B is effected by a suitable number of resilient loops or stays E to hold the tube sufficiently rigid while nevertheless allowing it a certain amount of flexibility. These resilient stays are preferably in the form of coiled springs passing around the rod B, formed at the ends with eyes which are attached to rings F screwed on to the outside of the spring tube A. These rings are formed with a circumferential throat or groove to receive the eyes at the ends of the spring loops E which are fixed in position therein by a pin *a*. The rods B are fixed by nuts in two end rings or frames C which are fixed to the floor in any suitable way, for example by means of standards or supports D.

Instead of employing coiled spring loops E for resiliently suspending the tube A centrally of the rods B, I might use rods, loops or the like of supple rubber.

It will be seen from the above explanation that the tube A is entirely isolated from all rigid parts liable to transmit the vibrations of the rotating bar to the points at which the suspended arrangement is fixed, and that as the shocks of the bar can only act upon the non resonant surface of the tube and of a resilient system, all shock is absorbed by the suspension system. Consequently even when the bar under operation is twisted, little or no noise is caused.

The manner of use of the device is indicated in Fig. 3, where a rod G to be turned in a lathe H is supported upon the device of the present invention, the end only of the rod being projected beyond the support and to a suitable point on the lathe.

What I claim and desire to secure by Letters Patent is:—

1. A suspension device for the purpose described, comprising a tube, fixed rods, and resilient means suspending said tube from said rods.

2. A suspension device for the purpose described, comprising a tube, fixed rods, and resilient means suspending said tube from said rods, and end frames carrying said rods and adapted to rest upon a floor.

3. A suspension device for the purpose described, comprising a tubular coiled spring, fixed rods, and resilient means suspending said tubular spring from said rods.

4. A suspension device for the purpose described, including a tube, a group of at least three fixed rods surrounding said tube, and resilient means supporting said tube approximately centrally of said rods.

In witness whereof, I have hereunto signed my name in the presence of two subscribing witnesses.

FERDINAND GIRARD.

Witnesses:
 H. C. COXE,
 RENÉ BARDY.